US008328455B2

(12) United States Patent
Na et al.

(10) Patent No.: US 8,328,455 B2
(45) Date of Patent: Dec. 11, 2012

(54) END-CONNECTOR OF SELECT CABLE FOR MANUAL TRANSMISSION IN VEHICLE

(75) Inventors: Myunglyul Na, Suwon-si (KR); Kyujung Kim, Daegu (KR)

(73) Assignees: Hyundai Motor Company, Seoul (KR); Kia Motors Corporation, Seoul (KR); Kyung Chang Industrial Co., Ltd., Daegu (KR)

( * ) Notice: Subject to any disclaimer, the term of this patent is extended or adjusted under 35 U.S.C. 154(b) by 203 days.

(21) Appl. No.: 12/940,867

(22) Filed: Nov. 5, 2010

(65) Prior Publication Data

US 2012/0000310 A1 Jan. 5, 2012

(30) Foreign Application Priority Data

Jun. 30, 2010 (KR) ........................ 10-2010-0062594

(51) Int. Cl.
*F16C 1/14* (2006.01)
(52) U.S. Cl. ...................... 403/163; 403/146; 74/473.15
(58) Field of Classification Search .................. 403/145, 403/146, 161, 163; 74/473.15, 473.16, 500.5, 74/502.4, 502.6, 473.14
See application file for complete search history.

(56) References Cited

U.S. PATENT DOCUMENTS

| | | | | |
|---|---|---|---|---|
| 5,518,332 A | * | 5/1996 | Katoh | 74/502.4 |
| 5,839,846 A | | 11/1998 | Shimada et al. | |
| 5,937,705 A | * | 8/1999 | Corbett et al. | 74/502.6 |
| 6,109,132 A | * | 8/2000 | Frye | 74/502.4 |
| 2007/0137356 A1 | | 6/2007 | Itoh et al. | |
| 2007/0245848 A1 | * | 10/2007 | Schulz et al. | 74/502.6 |
| 2008/0250892 A1 | * | 10/2008 | Gordy et al. | 74/502.6 |
| 2010/0251847 A1 | * | 10/2010 | Gordy | 74/502.6 |

FOREIGN PATENT DOCUMENTS

| | | |
|---|---|---|
| JP | 2007-146897 A | 6/2007 |
| JP | 2008-19973 A | 1/2008 |
| KR | 10-0891315 B1 | 4/2009 |
| KR | 10-2009-0082037 A | 7/2009 |

* cited by examiner

*Primary Examiner* — Michael P Ferguson
(74) *Attorney, Agent, or Firm* — Morgan, Lewis & Bockius LLP

(57) ABSTRACT

An end-connector of a select cable for a manual transmission is configured to allow a driver to perform a sufficiently smooth selecting operation even with small force by ball joint type combination between a rear protrusion of a fastener and a ball portion of a connector pin. The end-connector includes a connector housing integrally connected with both ends of a select cable and having a housing hole formed through the left and right sides, a fastener inserted in the housing hole of the connector housing, with one end protruding through the housing hole, an elastic clip member fixed to the connector housing and restraining the end of fastener which protrudes from the housing hole to prevent the fastener from separating from the housing hole, and a connector pin assembled with the fastener to freely rotate with the other end of the fastener in the housing hole.

11 Claims, 6 Drawing Sheets

(Prior Art)

(Prior Art)

*(Prior Art)*

END-CONNECTOR OF SELECT CABLE FOR MANUAL TRANSMISSION IN VEHICLE

CROSS-REFERENCE TO RELATED APPLICATIONS

The present application claims priority to Korean Patent Application Number 10-2010-0062594 filed Jun. 30, 2010, the entire contents of which application is incorporated herein for all purposes by this reference.

BACKGROUND OF THE INVENTION

1. Field of the Invention

The present invention relates to an end-connector of a select cable for a manual transmission, and more particularly, to an end-connector of a select cable for a manual transmission that makes it possible to perform smooth selecting with small force and provides clearer selecting feel for a driver.

2. Description of Related Art

In general, manual transmissions mounted in vehicles are configured such that a select lever and a shift lever of the transmission are operated by selection and shifting operations of a shift lever to select and shift a shift range, and power according to shift is transmitted through a corresponding gear train of a plurality of gear trains in the transmissions.

In this configuration, a select cable 1 transmitting the selecting operation of the shift lever to the select lever of the transmission, as shown in FIGS. 1 to 3, has an end-connector 10 at both ends. End-connector 10 of the related art is formed by inserting rubber 13 in between an outer cylinder 11 and an inner cylinder 12 and outer cylinder 11 is connected with select cable 1.

A connector pin 14 is inserted in a hole formed at the center of inner cylinder 12 and integrally formed with a lever bracket 21 rotatably disposed in a shift lever housing and a select lever 23 rotatably disposed in a transmission housing.

In this configuration, lever bracket 21 is connected with the shift lever to be rotatable with respect to the shift lever housing by the selecting operation of the shift lever and select lever 23 is rotatably disposed in the transmission housing to transmit power to a control shaft disposed in the transmission.

A washer 15 is fitted on connector pin 14 passing through inner cylinder 12 and a stopper pin 16 passes through connector pin 14 after washer 15 is fitted. Therefore, end connector 10 and washer 15 are fixed by stopper pin 16 and prevented from separating from connector pin 14.

End-connectors 10 are connected to both ends of select cable 1, with the shift lever at the neutral position, in which large force requires to perform smooth selecting operation of the shift lever, when select cable 1 twists or end connectors 10 are twisted and connected at a large angle out of a normal range.

That is, when select cable 1 twists or end connectors 10 are twisted and connected at a large angle out of a normal range, torque is exerted in rubber 13 of end connector 10, such that stiffness of rubber 13 increases.

The increase of stiffness of rubber 13 increases resistance against the selecting operation of the shift lever, such that the driver should operate the shift lever with larger force than the resistance to smoothly performing the selecting operation, and thus, fatigue of the driver increases due to operating the shift lever.

Further, end connector 10 absorbs selecting operational feel through rubber 13, such that small selecting operational feel is transmitted to the driver, if excessive, selecting operational feel is not transmitted to the driver.

The information disclosed in this Background section is only for enhancement of understanding of the general background of the invention and should not be taken as an acknowledgement or any form of suggestion that this information forms the prior art already known to a person skilled in the art.

BRIEF SUMMARY OF THE INVENTION

Various aspects of the present invention are directed to provide an end-connector of a select cable for a manual transmission that allows a driver to smoothly perform selecting operation of a shift lever with small force and considerably reduce fatigue of the driver due to operating the shift lever, even if the select cable twists or the end-connector are connected at an angle out of a normal range.

Further, various aspects of the present invention are directed to provide clearer selecting operational feel to the driver by removing rubber that absorbs selecting operational feel from the end-connector.

One aspect of the present invention provides an end-connector of a select cable for a manual transmission, which may include a connector housing integrally connected with both ends of a select cable and having a housing hole formed through the left and right sides, a fastener inserted in the housing hole of the connector housing, with one end protruding through the housing hole, an elastic clip member fixed to the connector housing and restraining the end of fastener which protrudes from the housing hole to prevent the fastener from separating from the housing hole, and a connector pin assembled with the fastener to freely rotate with the other end of the fastener in the housing hole.

Further, the end-connector of a select cable for a manual transmission may further include a spring member positioned in a space between the connector housing and the fastener in the housing hole and having one end supported by the fastener and the other end support by the elastic clip member to prevent the fastener from freely moving.

The fastener may have a cylindrical pipe-shaped body positioned, with the spring member around the outer side, in the housing hole, a front protrusion extending from one end of the body and protruding from the housing hole in a triangular cross section, and having a clip groove integrally formed along the circumference to fit the elastic clip member, at the joint with the body, and a rear protrusion extending from the other end of the body in an arch-shaped cross section, in which the end of the connector pin is fitted to be relatively and freely rotatable and of which the outer side supports one end of the spring member.

According to other aspects of the invention, an end-connector of a select cable allows a driver to perform a sufficiently smooth selecting operation even with small force by ball joint type combination between a rear protrusion of a fastener and a ball portion of a connector pin, therefore, it is possible to considerably reduce fatigue of the driver due to operating the shift lever and the selecting operation feel is sufficiently transmitted to the driver operating the shift lever, such that the driver can feel clearer the selecting operation.

The methods and apparatuses of the present invention have other features and advantages which will be apparent from or are set forth in more detail in the accompanying drawings, which are incorporated herein, and the following Detailed Description of the Invention, which together serve to explain certain principles of the present invention.

DETAILED DESCRIPTION OF THE INVENTION

Reference will now be made in detail to various embodiments of the present invention(s), examples of which are illustrated in the accompanying drawings and described below. While the invention(s) will be described in conjunction with exemplary embodiments, it will be understood that present description is not intended to limit the invention(s) to those exemplary embodiments. On the contrary, the invention(s) is/are intended to cover not only the exemplary embodiments, but also various alternatives, modifications, equivalents and other embodiments, which may be included within the spirit and scope of the invention as defined by the appended claims.

Figure 1:
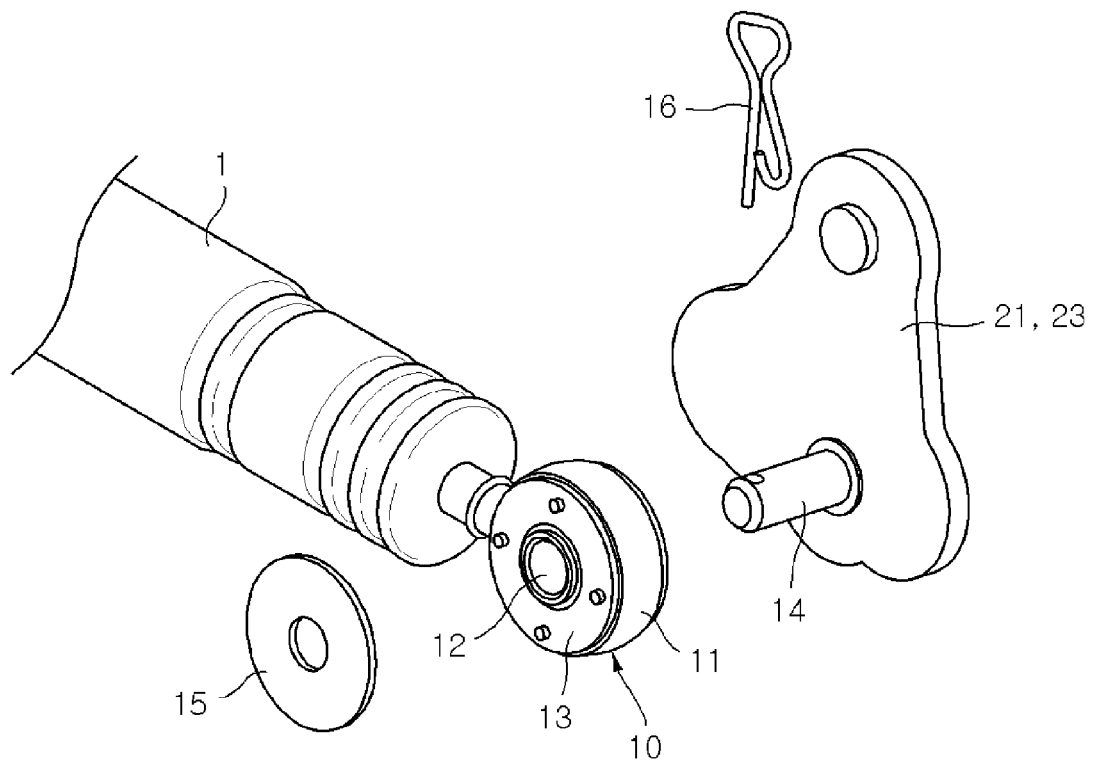
FIGS. 1 and 2 are an exploded perspective view and an assembly perspective view which illustrate an end-connector connected at both end of a select cable in the related art.
Figure 2:
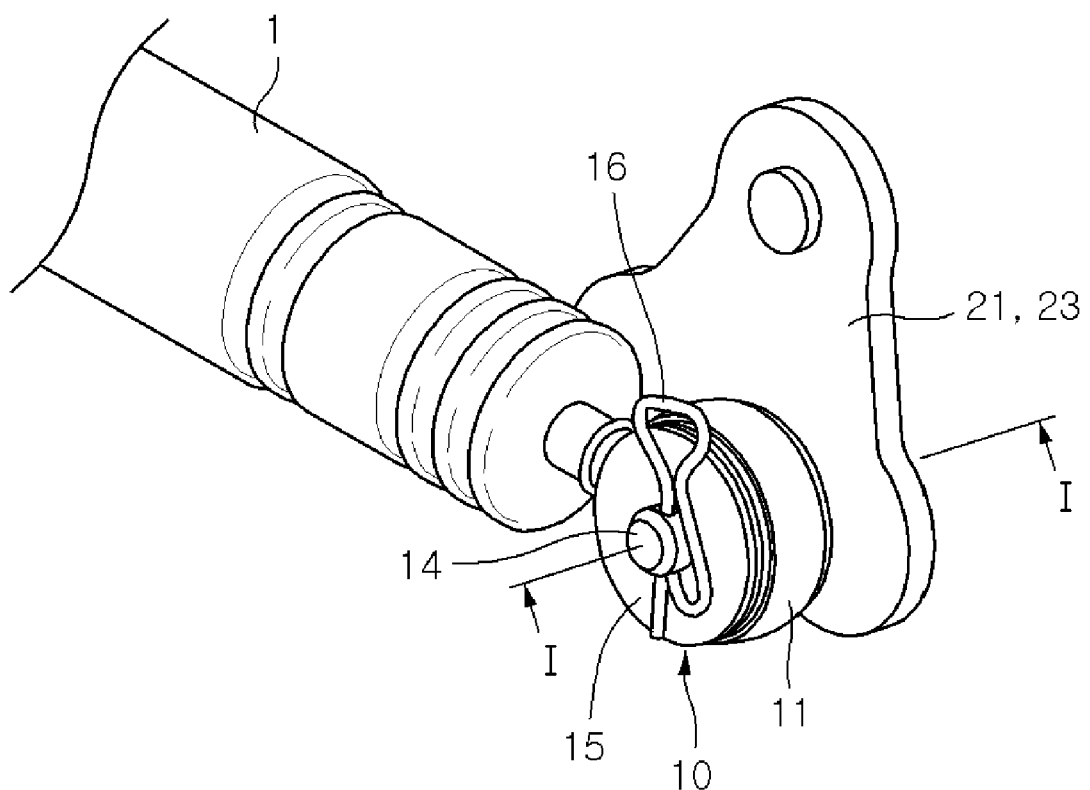
Figure 3:
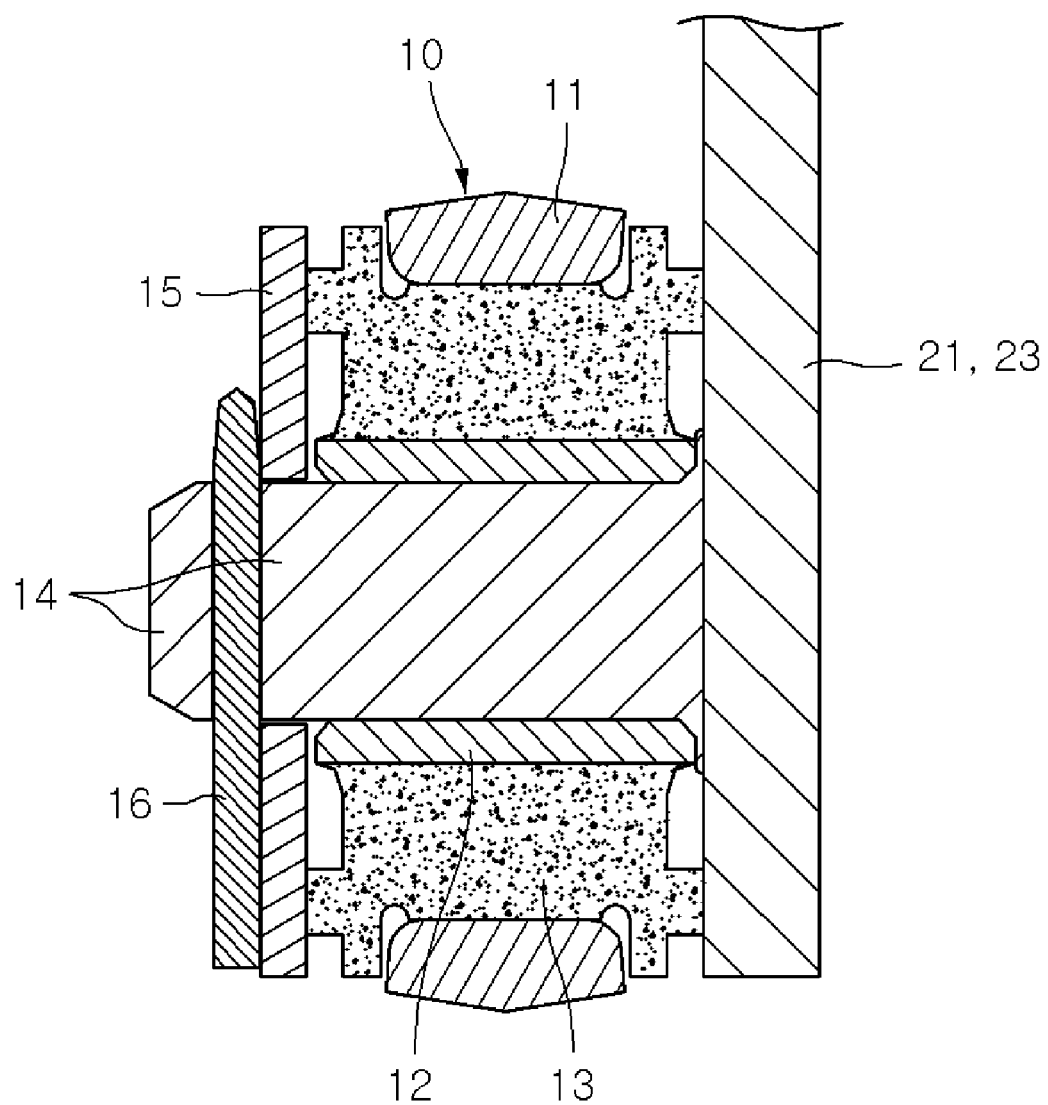
FIG. 3 is a cross-sectional view taken along the line I-I' of FIG. 2.
Figure 4:
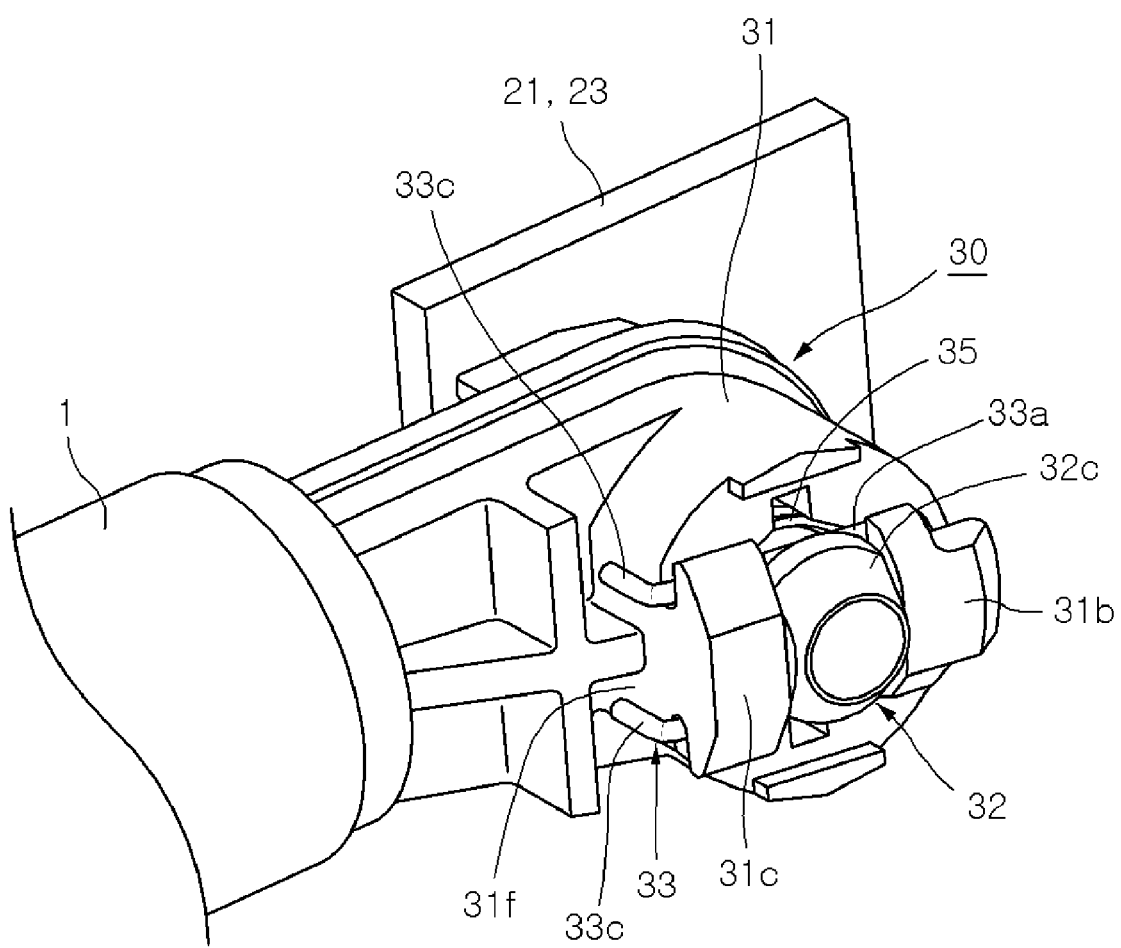
FIG. 4 is a perspective view illustrating an exemplary end-connector of a select cable according to the present invention.
Figure 5:
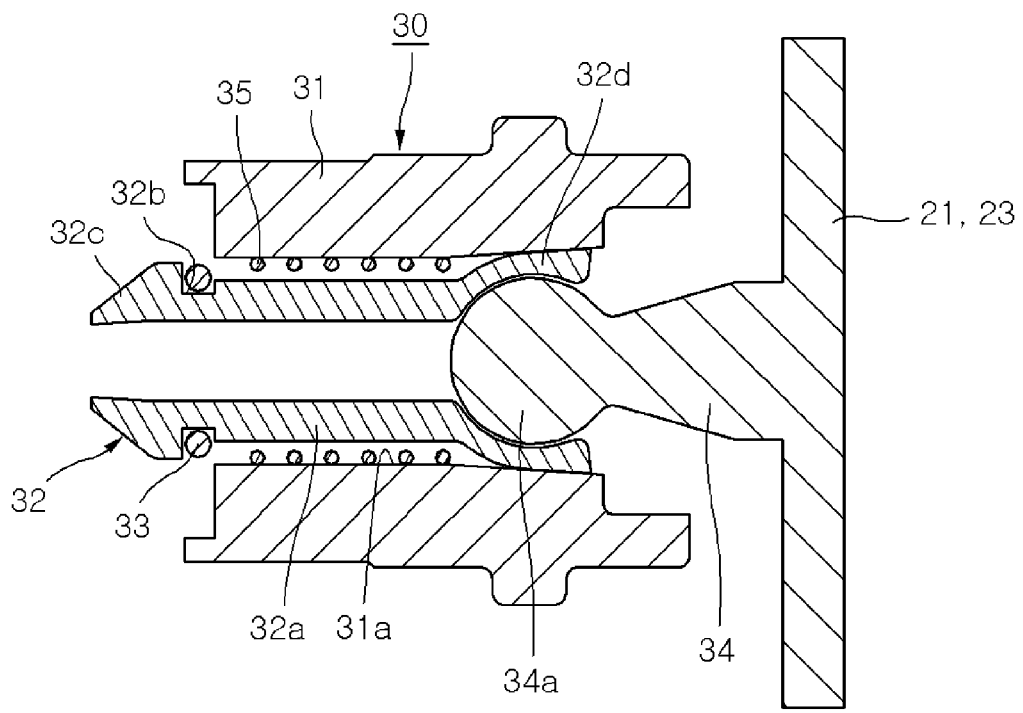
FIG. 5 is a cross-sectional view of FIG. 4.
Figure 6:
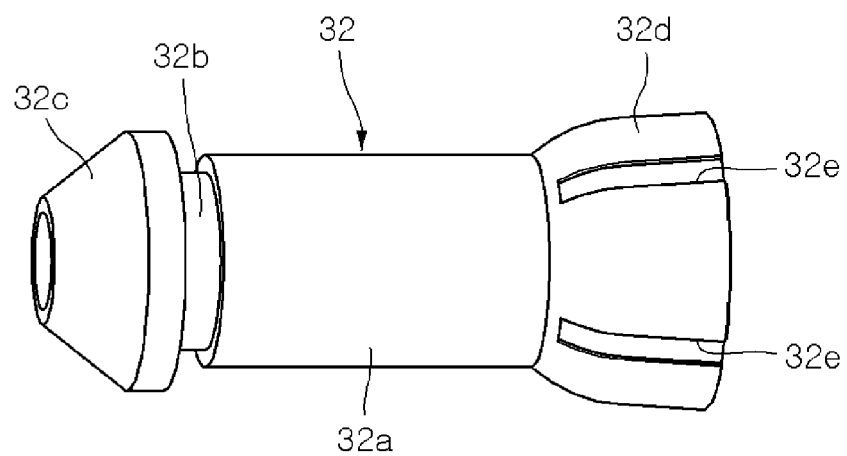
FIG. 6 is a perspective view a fastener of the exemplary end-connector of the present invention.
Figure 7:
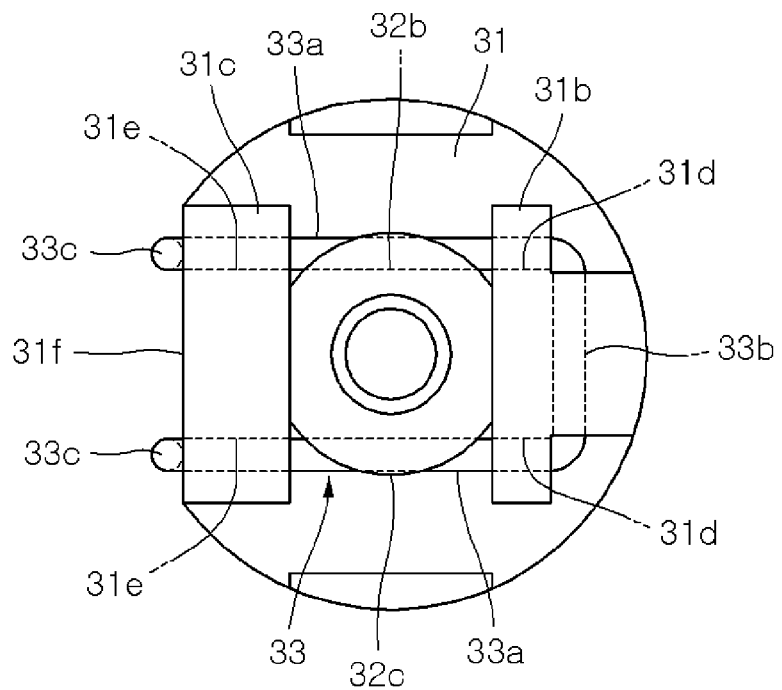
FIG. 7 is a front view of FIG. 4.
Figure 8:
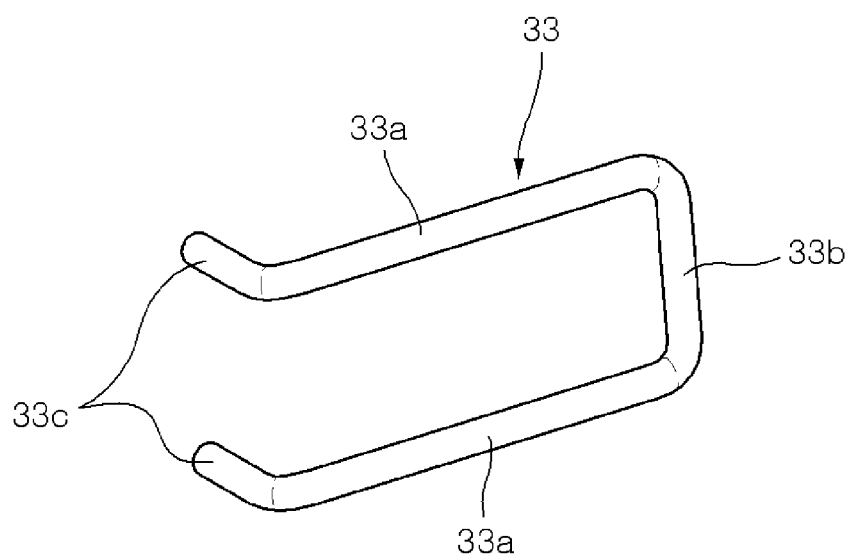
FIG. 8 is a perspective view showing an exemplary elastic clip member of the end-connector of the present invention.

In a vehicle equipped with a manual transmission, a select cable 1 transmitting a selecting operation of a shift lever to a select lever in the transmission has an end connector 30 at both ends, as shown in FIGS. 4 to 8, in which end connector 30 includes a connector housing 31 integrally connected with both ends of select cable 1. In various embodiments, the connector housing my be monolithically formed with the select cable. The connector housing includes a housing hole 31a formed through the left and right sides, a fastener 32 inserted in housing hole 31a of connector housing 31, with one end protruding through housing hole 31a, an elastic clip member 33 fixed to connector housing 31 and restraining the end of fastener 32 which protrudes from housing hole 31 to prevent fastener 32 from separating from housing hole 31a, a connector pin 34 assembled with fastener 32 to freely rotate with the other end of fastener 32 in housing hole 31a, and a spring member 35 positioned in a space between connector housing 31 and fastener 32 in housing hole 31a and having one end supported by fastener 32 and the other end support by elastic clip member 33 to prevent fastener 32 from freely moving.

In this configuration, fastener 32 has a cylindrical pipe-shaped body 32a positioned, with spring member 35 around the outer side, in housing hole 31a, a front protrusion 32c extending from one end of body 32a and protruding from housing hole 31a in a triangular cross section, and having a clip groove 32b integrally formed along the circumference to fit elastic clip member 33, at the joint with body 32a, and a rear protrusion 32d extending from the other end of body 32a in an arch-shaped cross section, in which the end of connector pin 34 is fitted to be relatively and freely rotatable and of which the outer side supports one end of spring member 35. In various embodiments, the clip groove may be monolithically formed on the fastener.

A plurality of cut-holes 32e, which allows rear protrusion 32d to elastically open and extends toward front protrusion 32c from the end of rear protrusion 32d, is formed around the circumference in rear protrusion 32d.

That is, cut-holes 32e help rear protrusion open outward, when a ball portion 34a of connector pin 34, which is described below, in inserted into rear protrusion 32d, and rear protrusion 32d that has opened outward closes and returns to the initial shape, after ball portion 34a of connector pin 34 is inserted in rear protrusion 32d.

First and second housing protrusions 31b, 31c protrude from both sides of front protrusion 32c, on the surface where front protrusion 32c of fastener 32 protrude, and protrusion grooves 31d, 31e that are inserted when elastic clip member 33 is inserted in clip groove 32b of front protrusion 32c are integrally formed in first and second housing protrusions 31b, 31c, respectively. One will appreciate that the protrusion grooves may be monolithically formed with the first and second housing protrusions.

Two protrusion grooves 31d, 31e are formed in first and second housing protrusions 31b, 31c, respectively.

Elastic clip member 33 has a pair of straight rod portions 33a that is fitted in clip groove 32b of front protrusion 32c and protrusion grooves 31d, 31e of first and second housing protrusions 31b, 31c, and can elastically open outward, a front connecting portion 33b connecting the ends of straight rod portions 33a in a U-shape and locked to the front of first housing protrusion 31b, and rear ends 33c bending in an L-shape from the ends of straight rod portions 33a and supported by a vertical surface 31f extending in the longitudinal direction of fastener 32 at the sides of second housing protrusion 31c.

Ball portion 34a that is combined with rear protrusion 32d of fastener 32 in a ball joint type is integrally formed at the end of connector pin 34. One will appreciate that the ball portion may be monolithically formed with the connector pin.

As described above, as rear protrusion 32d of fastener 32 and ball portion 34a of connector pin 34 are combined in a ball joint type, fastener 32 and connector pin 34 more smoothly operate, when selecting operation force of the shift lever is transmitted, such that a driver can perform sufficiently smooth selecting operation with small force while not feeling hard locking, when performing the selecting operation.

Connector pin 34 is combined with a lever bracket 21 rotatably disposed in shift lever housing and a select lever 23 rotatably disposed in a transmission housing, in which lever bracket 21 is operated by the selecting operation force of the shift lever and select lever 23 is connected with a control shaft in the transmission to transmit power.

The operation of various embodiments of the present invention is described hereafter.

End-connectors 30 are connected to both ends of select cable 1 when the shift lever is at the neutral position.

In this configuration, select cable 1 may twist or end-connectors 30 may be connected in an abnormal state at an angle significantly departing from a normal range.

When assemblage is made in the abnormal state and the driver perform the selecting operation by operating the shift lever, the driver should apply excessively large force, because it is difficult to perform the selecting operation of the shift lever with small force due to the stiffness of rubber 13 in end-connector 10 of the related art that is increased by torque, thereby increasing fatigue of the driver due to operating the shift lever.

However, since end-connector 30 according to the present invention has a structure combining rear protrusion 32d of fastener 32 with ball portion 34a of connector pin 34 in a ball joint type, without using rubber that changes in stiffness, a driver can perform a sufficiently smooth selecting operation with small force and it is possible to considerably reduce fatigue of the driver due to operating the shift lever.

Further, a driver can hardly feel the selecting operation, because the selecting operation feel is absorbed by rubber 13 in end-connector 10 of the related art, however, end-connector 30 of the present invention does not have a part absorbing the selecting operation feel, such as rubber, such that sufficient selecting operation feel is transmitted to the driver operating the shift lever and accordingly, the driver can feel clearer selecting operation.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described in order to explain certain principles of the invention and their practical application, to thereby enable others skilled in the art to make and utilize various exemplary embodiments of the present invention, as well as various alternatives and modifications thereof. It is intended that the scope of the invention be defined by the Claims appended hereto and their equivalents.

What is claimed is:

1. An end-connector of a select cable for a manual transmission comprising:
    a connector housing integrally connected with each respective end of the select cable and having a housing hole formed through front and rear surfaces of the connector housing;
    a fastener having a cylindrical pipe-shaped body inserted in the housing hole of the connector housing, with one end of the fastener protruding from the front surface of the connector housing through the housing hole;
    an elastic clip member disposed in front of the connector housing and connected to the one end of the fastener, wherein a portion of the elastic clip member is larger than a diameter of the housing hole for restraining the one end of the fastener which protrudes from the housing hole so as to prevent the fastener from being rearwardly retracted through the housing hole; and
    a helical spring member positioned around an outer side of the cylindrical pipe-shaped body within the housing hole in a space between the connector housing and the fastener and having one end supported by the fastener and the other end support by the elastic clip member to prevent the fastener from freely moving within the housing hole;
    wherein the fastener further comprises:
    an annular front protrusion extending from one end of the cylindrical pipe-shaped body and protruding from the front surface of the connector housing and the housing hole and comprising a lip having a triangular cross section, and having a clip groove integrally formed along a circumference of the front protrusion to fit the elastic clip member, wherein the clip member is inserted in the clip groove such that the clip member abuts the front surface of the connector housing and a rear surface of the front protrusion; and
    an annular rear protrusion extending from the other end of the cylindrical pipe-shaped body and comprising a socket having an arch-shaped cross section and having a spherical interior cavity, in which a ball portion of a connector pin is rotatably fitted to be relatively and freely rotatable and of which an outer side of the rear protrusion supports one end of the spring member.

2. The end-connector of a select cable for a manual transmission as defined in claim 1, wherein a plurality of cut-holes, which allows the rear protrusion to elastically open and extends toward the front protrusion from the end of the rear protrusion, is formed around the circumference in the rear protrusion.

3. The end-connector of a select cable for a manual transmission as defined in claim 1, wherein first and second housing protrusions protrude from the front surface of the connector housing on opposing sides of the front protrusion, and
    wherein protrusion grooves are integrally formed in the first and second housing protrusions respectively and aligned with the clip groove, the protrusion grooves receiving the elastic clip member when the elastic clip member is inserted in the clip groove of the front protrusion.

4. The end-connector of a select cable for a manual transmission as defined in claim 3, wherein the elastic clip member has a pair of straight rod portions that is fitted in the clip groove of the front protrusion and the protrusion grooves of the first and second housing protrusions, and elastically opens outward,
    a front connecting portion connecting the ends of the straight rod portions in a U-shape and locked to a rear surface of the first housing protrusion, and
    rear ends bending in an L-shape from the ends of the straight rod portions and supported by a vertical surface extending in the longitudinal direction of the fastener at the sides of the second housing protrusion.

5. The end-connector of a select cable for a manual transmission as defined in claim 3, wherein the protrusion grooves are monolithically formed in the first and second housing protrusions.

6. The end-connector of a select cable for a manual transmission as defined in claim 1, wherein the ball portion is integrally formed at the end of the connector pin.

7. The end-connector of a select cable for a manual transmission as defined in claim 6, wherein the ball portion is monolithically formed with the connector pin.

8. The end-connector of a select cable for a manual transmission as defined in claim 1, wherein the connector pin is combined with a lever bracket rotatably disposed in a shift lever housing, and the lever bracket is operated by selecting operation force of the shift lever.

9. The end-connector of a select cable for a manual transmission as defined in claim 1, wherein the connector pin is combined with a select lever rotatably disposed in a transmission housing, and the select lever is connected with a control shaft in the transmission to transmit power.

10. The end-connector of a select cable for a manual transmission as defined in claim 1, wherein the connector housing is monolithically formed on each respective end of the select cable.

11. The end-connector of a select cable for a manual transmission as defined in claim 1, wherein the clip groove is monolithically formed on the front protrusion.

* * * * *